United States Patent
Beaurepaire et al.

(10) Patent No.: US 11,594,137 B2
(45) Date of Patent: Feb. 28, 2023

(54) METHOD AND APPARATUS FOR PROVIDING MOBILITY INSIGHT DATA FOR POINTS OF INTEREST

(71) Applicant: HERE GLOBAL B.V., Eindhoven (NL)

(72) Inventors: Jerome Beaurepaire, Berlin (DE); Jens Unger, Berlin (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 17/319,851

(22) Filed: May 13, 2021

(65) Prior Publication Data
US 2021/0280067 A1     Sep. 9, 2021

Related U.S. Application Data

(63) Continuation of application No. 16/261,023, filed on Jan. 29, 2019, now Pat. No. 11,017,675.

(51) Int. Cl.
| | |
|---|---|
| *G08G 1/00* | (2006.01) |
| *G01C 21/36* | (2006.01) |
| *G06Q 10/02* | (2012.01) |
| *G06Q 50/30* | (2012.01) |
| *G08G 1/123* | (2006.01) |

(52) U.S. Cl.
CPC ......... *G08G 1/207* (2013.01); *G01C 21/3682* (2013.01); *G06Q 10/02* (2013.01); *G06Q 50/30* (2013.01); *G08G 1/123* (2013.01)

(58) Field of Classification Search
None
See application file for complete search history.

(56) References Cited

U.S. PATENT DOCUMENTS

| | | | |
|---|---|---|---|
| 9,689,693 B2* | 6/2017 | Newlin | G08G 1/0104 |
| 9,949,267 B2 | 4/2018 | Carnevale et al. | |
| 10,628,758 B2* | 4/2020 | Ikeda | G06Q 10/02 |
| 2016/0231129 A1 | 8/2016 | Erez et al. | |
| 2016/0298974 A1 | 10/2016 | Newlin et al. | |
| 2017/0068551 A1 | 3/2017 | Vadodaria | |

(Continued)

OTHER PUBLICATIONS

Ustohal, "Right Place, Right Time: Analysis of Car Sharing Availability in Berlin", Mar. 4, 2018, retrieved from https://medium.com/@itshonza/wednesday-9pm-raining-3fbfba071069, 12 pages.

(Continued)

*Primary Examiner* — Adolf Dsouza
(74) *Attorney, Agent, or Firm* — Ditthavong, Steiner & Mlotkowski

(57) ABSTRACT

An approach is provided for providing mobility insight data related to shared vehicles for a point of interest (POI). The approach involves retrieving shared vehicle data for the POI. The shared vehicle data indicates one or more shared vehicle events that have occurred, that are occurring at a given time, or a combination thereof within a threshold proximity of the POI. The approach also involves processing the shared vehicle data to determine mobility insight data. The mobility insight data includes a shared vehicle usage pattern, a shared vehicle availability pattern, or a combination thereof under one or more contexts for travel to or from the POI. The approach further involves presenting the mobility insight data in a location-based user interface.

20 Claims, 13 Drawing Sheets

(56) References Cited

U.S. PATENT DOCUMENTS

2017/0219367 A1   8/2017   Liu et al.
2017/0357914 A1   12/2017  Tulabandhula et al.
2018/0224866 A1   8/2018   Alonso-Mora et al.

OTHER PUBLICATIONS

O'Brien et al., "Mining Bicycle Sharing Data for Generating Insights Into Sustainable Transport Systems", Journal of Transport Geography, vol. 34, Jan. 2014, pp. 262-273.
Office Action for corresponding European Patent Application No. 20154112.5—1001, dated Jun. 29, 2020, 10 pages.

* cited by examiner

100

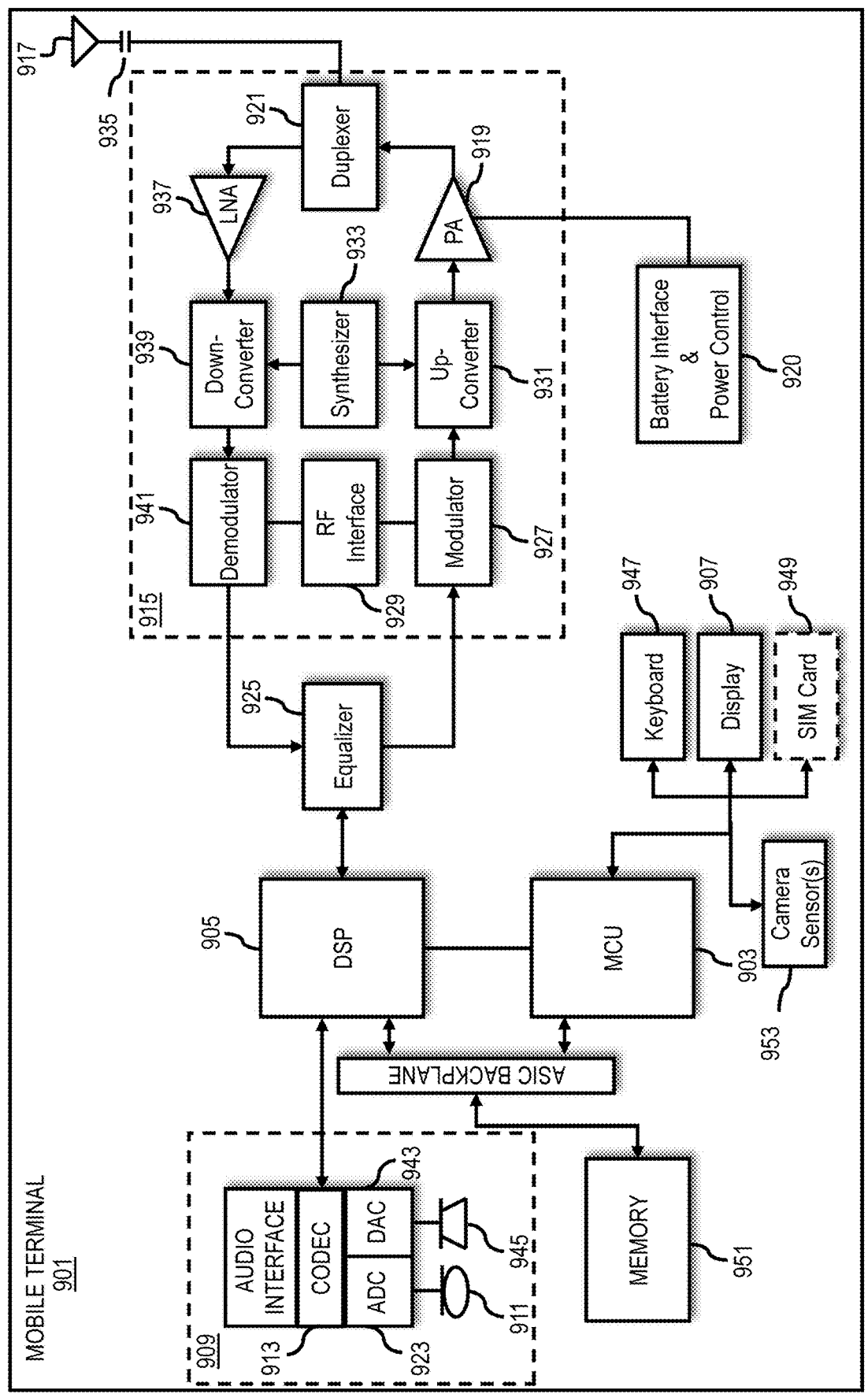

METHOD AND APPARATUS FOR PROVIDING MOBILITY INSIGHT DATA FOR POINTS OF INTEREST

RELATED APPLICATION

This application is a continuation of U.S. patent application Ser. No. 16/261,023, filed Jan. 29, 2019, entitled "METHOD AND APPARATUS FOR PROVIDING MOBILITY INSIGHT DATA FOR POINTS OF INTEREST," which is incorporated herein by reference in its entirety.

BACKGROUND

Providing navigation support to users is an important function for map service providers. Current navigation systems can provide route guidance to and from a point of interest (POI) such as a restaurant, a sporting or cultural venue, a shopping mall, etc. via various means or modes of transportation (e.g., private transportation, public transportation, walking, etc.). However, such systems are often restricted by the constraints of the static public transport network, the issue of having to find parking at the destination, etc. Vehicle sharing services (e.g., shared cars, shared bicycles, shared scooters, etc.) can alternatively offer users flexibility in where they can pick up and drop off shared vehicles. Consequently, users can avoid being restricted by the public transport network and/or can discover new places that are not convenient to reach via public transport. However, without knowing where shared vehicles are in relation to a POI that a user intends to visit, service providers face significant technical challenges to integrate shared vehicles into multimodal or intermodal navigation routes.

SOME EXAMPLE EMBODIMENTS

Therefore, there is a need for providing mobility insight data related to shared vehicles for a POI.

According to one embodiment, a computer-implemented method computing mobility insight data related to shared vehicles for a POI comprises retrieving shared vehicle data for the POI, wherein the shared vehicle data indicates one or more shared vehicle events that have occurred, that are occurring at a given time, or a combination thereof within a threshold proximity of the POI. The method also comprises processing the shared vehicle data to determine mobility insight data, wherein the mobility insight data includes a shared vehicle usage pattern, a shared vehicle availability pattern, or a combination thereof under one or more contexts for travel to or from the POI. The method further comprises presenting the mobility insight data in a location-based user interface.

According to another embodiment, an apparatus for computing mobility insight data related to shared vehicles for a POI comprises at least one processor, and at least one memory including computer program code for one or more computer programs, the at least one memory and the computer program code configured to, with the at least one processor, cause, at least in part, the apparatus to retrieve historical shared vehicle data for the POI, wherein the historical shared vehicle data indicates one or more shared vehicle events that have occurred within a threshold proximity of the POI. The apparatus is also caused to process the historical shared vehicle data to determine mobility insight data, wherein the mobility insight data includes a shared vehicle usage pattern, a shared vehicle availability pattern, or a combination thereof under one or more contexts for travel to or from the POI. The apparatus is further caused to present the mobility insight data in a location-based user interface based on a shared vehicle type, a shared vehicle operator, or a combination thereof.

According to another embodiment, a non-transitory computer-readable storage medium for computing mobility insight data related to shared vehicles for a POI carries one or more sequences of one or more instructions which, when executed by one or more processors, cause, at least in part, an apparatus to retrieve historical shared vehicle data for the POI, wherein the historical shared vehicle data indicates one or more shared vehicle events that have occurred within a threshold proximity of the POI. The apparatus is also caused to process the historical shared vehicle data to determine mobility insight data, wherein the mobility insight data includes a shared vehicle usage pattern, a shared vehicle availability pattern, or a combination thereof under one or more contexts for travel to or from the POI. The apparatus is further caused to present the mobility insight data in a location-based user interface.

According to another embodiment, an apparatus for computing mobility insight data related to shared vehicles for a POI comprises means for retrieving shared vehicle data for the POI, wherein the shared vehicle data indicates one or more shared vehicle events that have occurred, that are occurring at a given time, or a combination thereof within a threshold proximity of the POI. The apparatus also comprises means for processing the shared vehicle data to determine mobility insight data, wherein the mobility insight data includes a shared vehicle usage pattern, a shared vehicle availability pattern, or a combination thereof under one or more contexts for travel to or from the POI. The apparatus further comprises means for presenting the mobility insight data in a location-based user interface.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 9 is a diagram of a mobile terminal (e.g., handset or vehicle or part thereof) that can be used to implement an embodiment of the invention.

DESCRIPTION OF SOME EMBODIMENTS

Examples of a method, apparatus, and computer program for providing mobility insight data related to shared vehicles for a POI are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
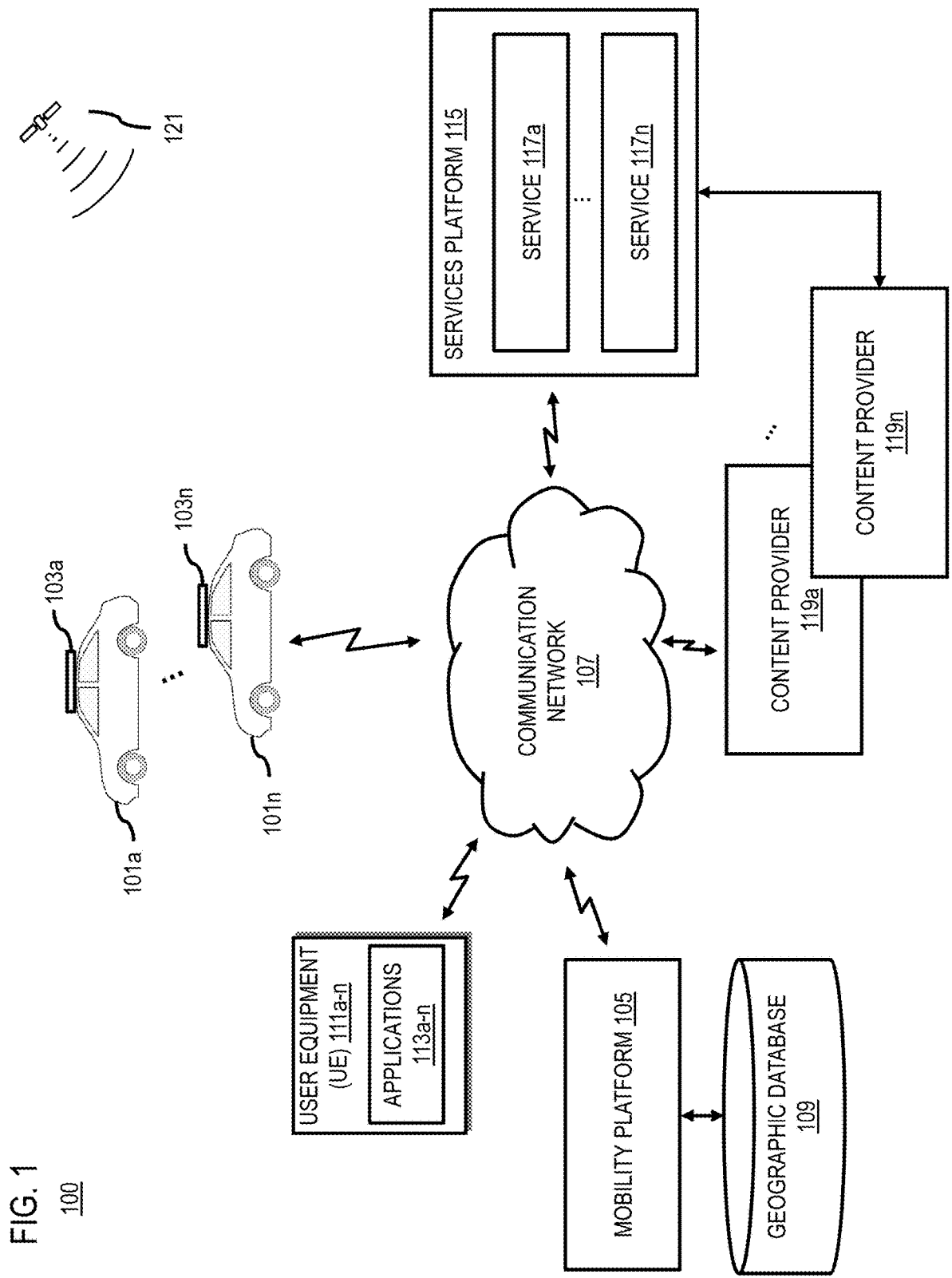
FIG. 1 is a diagram of a system capable of providing mobility insight data related to shared vehicles for a POI, according to one embodiment.

FIG. 1 is a diagram of a system capable of providing mobility insight data related to shared vehicles for a POI (e.g., shared vehicles within a geofenced or defined area around the POI), according to one embodiment. As described above, navigation systems can provide route guidance to and from a POI via various means or mode of transportation. For example, when a user requests a navigation route to a restaurant, for example, a navigation routing engine can identify all available transportation options. However, such systems are often restricted by the constraints of the static public transport network. For example, a user may not live near a public transportation station or hub (e.g., a bus or a train station). Similarly, a posted departure or arrival time may not coincide with the user's intended arrival or departure time at or from the POI, respectively.

Multimodal or intermodal routes can provide some flexibility with regards to navigation by combining multiple different modes of transportation (e.g., private vehicle, shared vehicle, public transportation, etc.) to provide a best (e.g., fastest time, shortest distance, etc.) navigation route to a POI. For example, when a user requests an intermodal route from a navigation system, a navigation routing engine can identify all available transportation options and select the best options to destination. However, this computed route is only best with respect to information available to the routing engine at the time that the routing engine computed the route. This limited information can be problematic particularly with respect to using or evaluating the use of shared vehicles as a transportation option for at least one segment of the computed route.

Information or insights related to a POI can be commonly found on the POIs website or a recommendation or review website. Information such as location, telephone number, ratings, reviews, busy hours, etc. can commonly be gleamed from such services. However, these services have yet to provide mobility related insights. For example, a user may want to know how they can go from where they are to a given destination (e.g., a restaurant) and then back home without being "restricted" to the public transport network (i.e., take advantage of a shared vehicle). Similarly, a user may want to discover new connections to places which are not convenient to reach via public transport but which are better connected using new mobility services such as shared cars, shared bikes, shared rollers, etc. However, without knowing where shared vehicles are in relation to a POI that a user intends to visit, service providers face significant technical challenges to integrate shared vehicles into multimodal or intermodal navigation routes.

For example, some cities or areas contain thousands of shared vehicles that could possibly influence computed navigation routes by providing alternative transportation options. However, knowledge of when or where these shared vehicles will become available for use as an option can be incomplete. This is because shared vehicles users often use these vehicles for unknown periods of time that can be difficult to predict. In the case of dockless vehicles or vehicles that do not have to be returned to specific locations, their check-in locations from a previous user can also be unknown which adds to the uncertainty.

To address these technical problems, a system 100 of FIG. 1 introduces a capability to provide mobility insight data related to shared vehicles for a POI, according to one embodiment. In one embodiment, the system 100 enables users to see mobility related information for a given POI (e.g., a restaurant) by retrieving shared vehicle data (e.g., historical data and/or real-time information) in order to provide relevant mobility insights to those users. In one instance, the system 100 can gather all events related to the shared vehicles in order to generate the most significant insights. By way of example, the insights may include when and where each shared vehicle is taken (i.e., check-out); when and where each shared vehicle is released (i.e., checked-in); how long each shared vehicle stays at a given location; where a shared vehicle is located within the threshold proximity to the POI at a given time; correlations that can be made relative to other factors such as weather, events, day of the week, etc.

In one embodiment, the system 100 of FIG. 1 may include one or more vehicles 101a-101n (also collectively referred to herein as vehicles 101) configured with one or more vehicle sensors 103a-103n (also collectively referred to herein as vehicle sensors 103) having connectivity to a mobility platform 105 via a communication network 107. In one embodiment, the vehicles 101 are shared vehicles (e.g., shared cars, shared bikes, shared scooters, shared rollers, etc.). In one instance, the shared vehicles are autonomous or semi-autonomous transport vehicles that can sense their environments and navigate without driver or occupant input via the vehicle sensors 103. Although the vehicles 101 are depicted as automobiles, it is contemplated that the vehicles 101 may be any type of transportation that may be shared (e.g., a car, a truck, a motorcycle, a bicycle, a scooter, etc.). In one instance, the shared vehicle data (e.g., historical data and/or real-time information) is based on information or data stored in or accessible via a geographic database (e.g., the geographic database 109), a digital map, or a combination thereof.

In one instance, the system 100 may determine or cluster the relevant mobility related information and/or shared vehicle data for a given POI in one or more ways. In one embodiment, the system 100 can gather all the shared vehicle data and/or mobility related insights in relation to a given POI. In one instance, the relationship may be defined by a geofenced area around a central point—the POI. More specifically, in one instance, the radius can be contextually defined the system 100 or adapted in scenarios where a circle is the not the most appropriate way of measuring such information (e.g., in instances where a POI borders a natural cut). In one embodiment, rather than clustering data in relation to a POI, the system 100 can determine or cluster data for a given area. Specifically, in one instance, the system 100 can gather all the shared vehicle data and/or mobility related insights for defined areas (e.g., either static squared areas or slightly overlapping circles). It is contemplated that while clustering data for a given area may be slightly less accurate than clustering data in relation to a POI, clustering data for a given area would have the advantage to be computed and maintained once for all areas (and not separately maintained for all existing POIs like in the geofenced area approach). For example, when a user selects a place/POI that she or he is willing to go but may be unsure how to come back due to a low frequency of busses late at night, the system 100 would retrieve the mobility related information for the area that the POI is located within.

In one embodiment, the system 100 processes retrieved historical data to compute insights related to a POI (e.g., restaurant A). For example, the system 100 can determine the following insights from the example historical data relative to restaurant A:

- 40% of the people are coming to the restaurant A by public transportation; 15% by private car; 20% by shared bikes; 10% by shared cars; 5% by shared scooters, etc.;
- At 8 PM, there are usually 3 shared bikes from Company A within 200 m of restaurant A; 2 shared scooters from Company B; and 2 shared cars from Company C;
- At 10 PM, there are usually 2 shared bikes from Company A within 200 of restaurant A; 1 shared scooter from Company B; and 1 shared car from Company C.

In one embodiment, the system 100 can surface the computed insights as distribution curves per mobility operator (e.g., Companies A, B, and C), which could also be generated in an interactive fashion.

In one embodiment, the system 100 surfaces or presents the mobility insight data to a user via one or more user equipment (UE) 111a-111n (also collectively referred to herein as UEs 111) (e.g., a mobile device, a smartphone, etc.). In one instance, the UEs 111 include one or more applications 113a-113n (also collectively referred to herein as applications 113) (e.g., a mapping application, a navigation application, a review or recommendation application, etc.).

In one instance, the presentation of the mobility insight data by the system 100 to a user may lead the user to adapt their own mobility patterns. For example, if a user sees that many people are going to a POI using shared vehicles (e.g., a shared car), the user may infer from the computed mobility insights that the POI is hard to reach by public transport; that it may hard to find parking near the POI; that the POI is well served by shared vehicles (e.g., may be near a town or city center); etc. In embodiment, a user may see that a POI (e.g., a restaurant) has some (possibly sponsored) shared vehicles (e.g., cars/bikes, etc.) that are reserved for their customers to go home. By way of example, the reserved shared vehicles may be in a "reserved" or "paying" state by the POI owner and released for a specific customer when needed. Knowing that a POI offers such an amenity may lead a user to prefer to go to this POI rather other potential choices and, therefore, adapt their own mobility patterns.

The system 100 in one instance can generate a recommendation when to go to a POI based on one or more shared vehicles related patterns. For example, knowing that there will likely be shared vehicles available until the close of the destination (e.g., a restaurant) can help users make wiser decisions as to when to arrive and when to leave the place to maximize their chances of finding a shared vehicle on the way back.

In one embodiment, the system 100 can personalize the one or more mobility insights to be surfaced to a user. For example, by default, the system 100 can make generic comments on the available shared vehicles if a user is not logged in to the system 100 (i.e., is not known). However, in one embodiment, if the system 100 knows the user, it would be able to know which services the user is registered to or with (e.g., 2 bike sharing companies, 2 scooter sharing companies, and one car sharing company) and therefore, generate a personalized recommendation based on such information or knowledge.

In one instance, the system 100 can recommend a new place to a user by combining known mobility patterns of the user (i.e., a mobility graph) and mobility insights related to shared vehicles for a POI. For example, a user may generally use public transport, hence the places she or he regularly visits are in the vicinity of public transport stations. As a result, the system 100 could suggest new places to the user based on the user's general mobility patterns (e.g., the user travels a maximum of 25 minutes to and from a place using public transport). In one instance, the system 100 could generate a recommendation for a new restaurant which is 25 minutes from home by a shared bike and 15 minutes back by a shared scooter, particularly when the system 100 knows that there should be available shared vehicles at the time she or he usually goes to dinner and at the time she or he usually returns (e.g., never after 11:15 PM).

In one embodiment, the system 100 can determine one or more mobility related insights for the way back when computing the original route to the destination. For example, the system 100 can determine that if the user goes now to the POI by public destination it will take approximately 35 minutes to reach the destination. Simultaneously, the system 100 can determine that on the way back, there are high chances that the user can take a shared scooter, which has an estimated time of arrival (ETA) at the user's home of 20 minutes or a shared bike, which has an ETA at the user's home of 30 minutes. In this instance, both options would enable the user to return home in less time than if the user took public transport.

Consequently, the system 100 enables a user to get some insights about the likelihood that one or more shared vehicles will be around the POI that they plan to visit (e.g., a restaurant), which is not possible to know by the user alone due to missing data. Similarly, if a user is more interested in discovering new places which are convenient to reach and go home from, the system 100 can also generate recommendations for such places based on the likelihood of shared vehicles being there at the relevant times.

Figure 2:
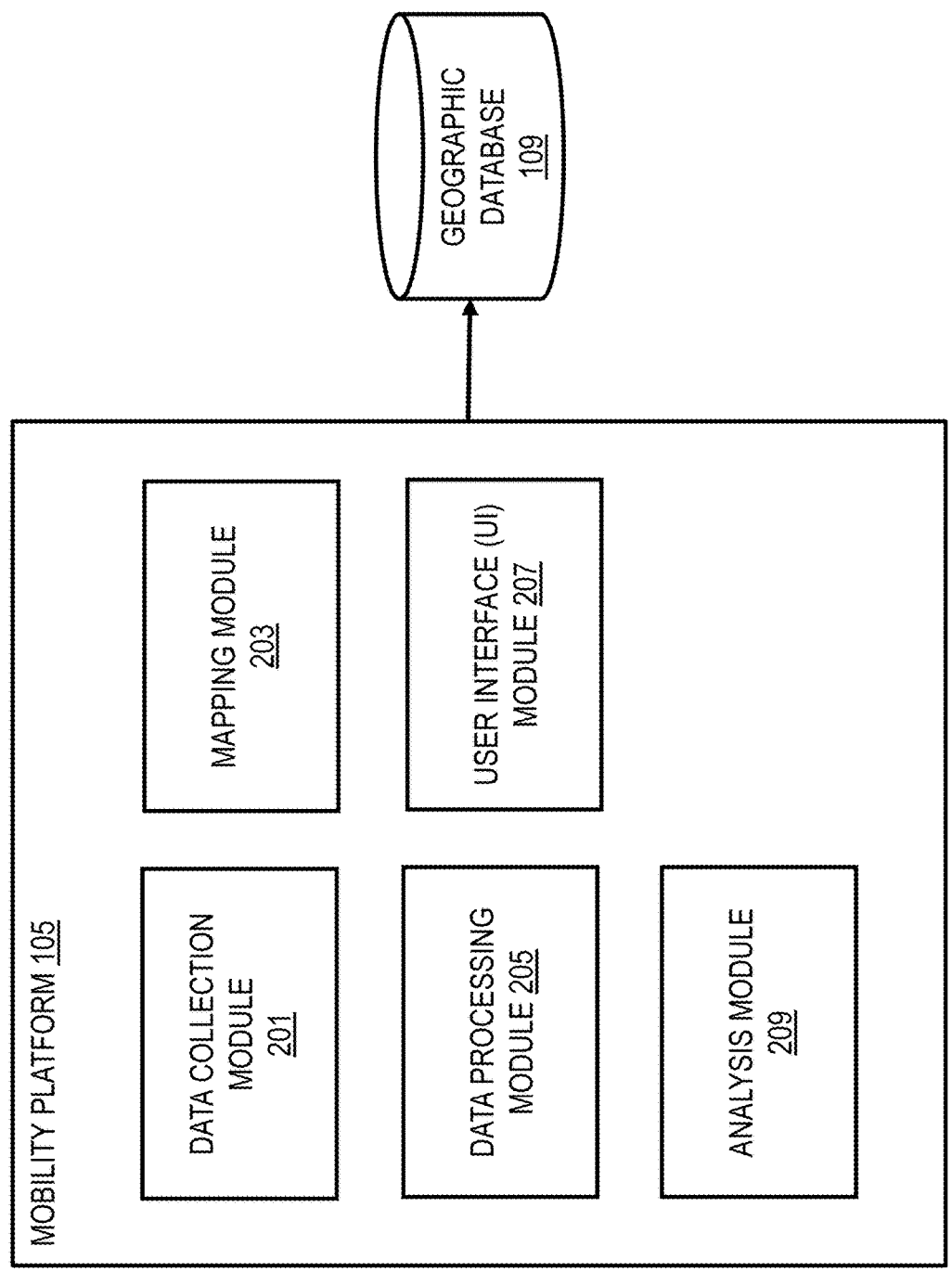
FIG. 2 is a diagram of the components of a mobility platform, according to one embodiment.

FIG. 2 is a diagram of the components of the mobility platform 105, according to one embodiment. By way of example, the mobility platform 105 includes one or more components for providing mobility insight data related to shared vehicles for a POI. It is contemplated that the functions of these components may be combined in one or more components or performed by other components of equivalent functionality. In one embodiment, the mobility platform 105 includes a data collection module 201, a mapping module 203, a data processing module 205, a user interface (UI) module 207, and an analysis module 209 with connectivity to the geographic database 109. The above presented modules and components of the mobility platform 105 can be implemented in hardware, firmware, software, or a combination thereof. Though depicted as separate entities in FIG. 1, it is contemplated that the mobility platform 105 may be implemented as a module of any of the components of the system 100. In another embodiment, the mobility platform 105 and/or one or more of the modules 201-209 may be implemented as a cloud-based service, local service, native application, or combination thereof. The functions of the mobility platform 105 and/or the modules 201-209 are discussed with respect to FIGS. 3 and 4 below.

Figure 3:
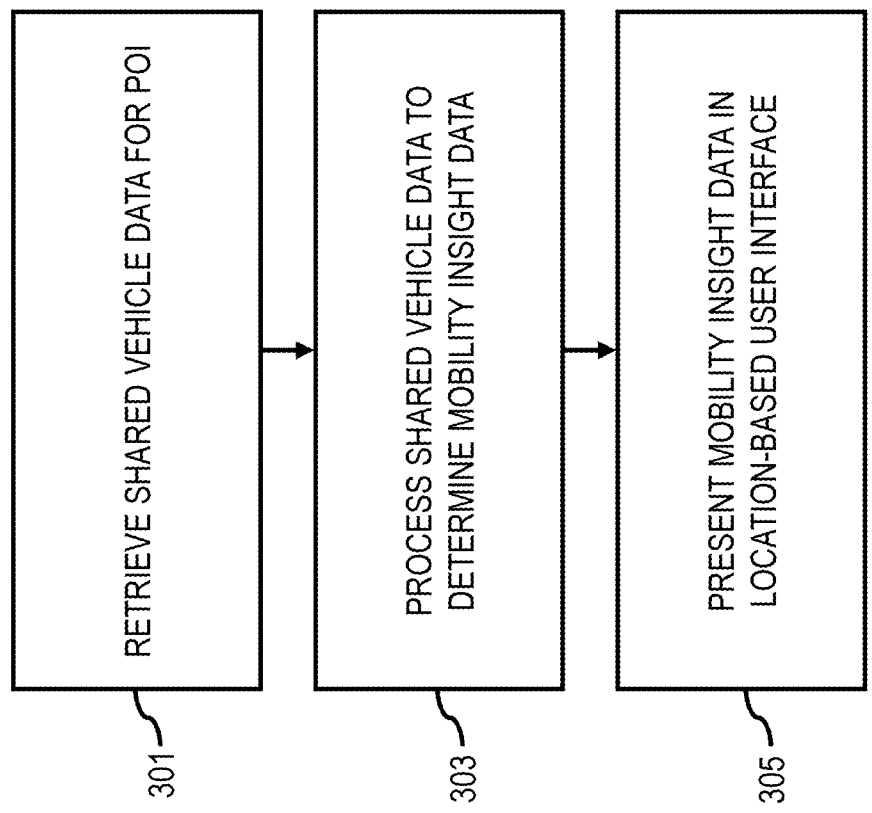
FIG. 3 is a flowchart of a process for providing mobility insight data related to shared vehicles for a POI, according to one embodiment.
Figure 8:
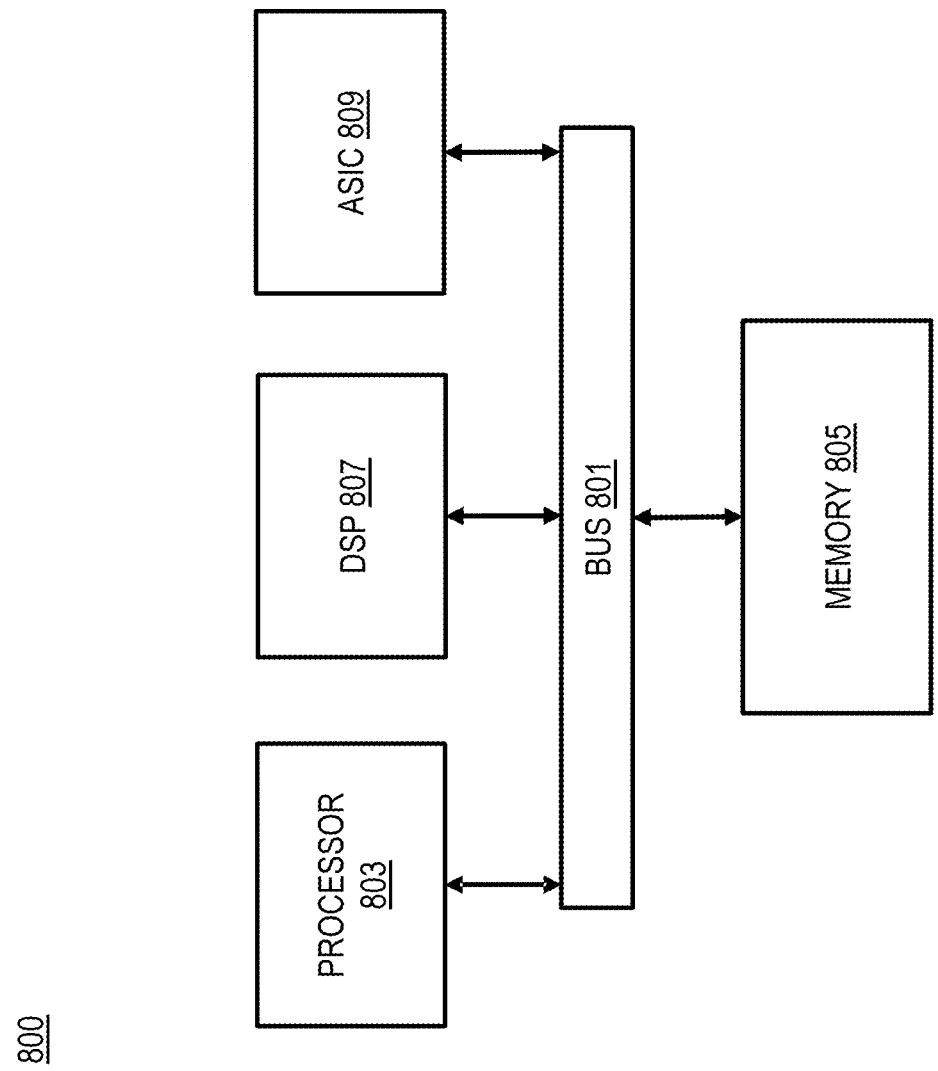
FIG. 8 is a diagram of a chip set that can be used to implement an embodiment of the invention.

FIG. 3 is a flowchart of a process for providing mobility insight data related to shared vehicles for a POI, according to one embodiment, according to one embodiment. In various embodiments, the mobility platform 105 and/or the modules 201-209 may perform one or more portions of the process 300 and may be implemented in, for instance, a chip set including a processor and a memory as shown in FIG. 8. As such, the mobility platform 105 and/or modules 201-209 can provide means for accomplishing various parts of the process 300, as well as means for accomplishing embodiments of other processes described herein in conjunction with other components of the system 100. Although the process 300 is illustrated and described as a sequence of steps, it is contemplated that various embodiments of the process 300 may be performed in any order or combination and need not include all of the illustrated steps.

In step 301, the data collection module 201 retrieves shared vehicle data (e.g., historical data and/or real-time information) for a POI (e.g., a restaurant, theater, etc.), wherein the shared vehicle data indicates one or more shared vehicle events that have occurred, that are occurring at a given time, or a combination thereof within a threshold proximity of the POI. By way of example, the historical shared vehicle data includes when and where a shared vehicle (e.g., a shared car, shared bike, or shared scooter) is taken (i.e., checked-out); when and where the shared vehicle is released (i.e., checked-in); how long the shared vehicle stayed at a given location within the proximity to the POI; and a correlation to a contextual parameter. By way of example, the real-time information may include where a shared vehicle is located within the threshold proximity to the POI at a given time (e.g., in real-time or substantially real-time). In one example, the contextual parameter may include factors like weather, events, day of the week, etc. In one embodiment, the data collection module 201 retrieves the shared vehicle data (e.g., historical data and/or real-time information) from information or data stored in or accessible via a geographic database (e.g., the geographic database 109), a digital map, or a combination thereof. In one instance, a POI may be any place (e.g., a restaurant, a theater, a sports or an entertainment venue, etc.) that a user may want to go and is wondering how they will go from where they are and/or how they will return to their present location or another location from the POI.

In one embodiment, the mapping module 203 first defines a geofenced area around the POI to compute or cluster the one or more shared vehicle events that have occurred within a threshold proximity of the POI. By way of example, the geofenced area may be a zone, a perimeter, and/or a boundary set or assigned around or surrounding a central point (e.g., the POI). In one instance, the mapping module 203 can contextually define the radius of the geofenced area or the mapping module 201 may adapt the area in situations where a circle is not the most appropriate way of measuring such information. In one embodiment, the number and proximity of shared vehicles to the POI determines the specific shape of the geofence and/or the geofenced area. In one embodiment, the mapping module 203 can compute or define the geofenced area such that a shared vehicle is less than a threshold distance and/or amount of time away from a given POI (e.g., within a walking distance).

In one instance, the mapping module 203 first defines a given or predefined area in which the POI is located to compute or to cluster the one or more shared vehicle events that have occurred within a threshold proximity of the POI. By way of example, the defined area may be static squared areas, slightly overlapping circles, or the like. In this example, when a user selects a POI she or he is interested in, the data collection module 201 retrieves the mobility related information for the area that the POI is located within.

In step 303, the data processing module 205 processes the shared vehicle data to determine mobility insight data, wherein the mobility insight data includes a shared vehicle usage pattern, a shared vehicle availability pattern, or a combination thereof under one or more contexts for travel to or from the POI. By way of example, the shared vehicle usage pattern may be determined based on a percentage of each type of vehicle that travels to or from the selected POI (e.g., public transport, private cars, shared bikes, shared cars, shared scooters, etc.). In one instance, the shared vehicle availability pattern may include the types and quantities of shared vehicles that are usually within a certain distance of the POI at a time of day or night. For example, in the example use case described above, at 8 PM, there are usually 3 shared bikes from Company A within 200 m of restaurant A, 2 shared scooters from Company B, and 2 shared cars from Company C. By way of example, the contexts for travel may include one or more temporal and/or contextual parameters for which a user is requesting the mobility insight data (e.g., time of day, day of week, holiday, weather condition, etc.). In one embodiment, the data processing module 205 can determine the mobility insight data with respect to a shared vehicle type (e.g., a car, a bicycle, a scooter), a shared vehicle operator (e.g., Company A, Company B, Company C, etc.), or a combination thereof. In one embodiment, the data processing module 205 can further organize the shared cars based on their respective operability (e.g., standard, autonomous, semi-autonomous, etc.).

In step 305, the UI module 207 presents the mobility insight data to a user in a location-based user interface. By way of example, the location-based user interface may be a mapping application, a navigation application, a review or recommendation application, etc. of a UE such as a mobile device, a smartphone, etc. In one embodiment, the UI module 207 presents the data in the location-based user interface as one or more distributions of shared vehicle availability (e.g., at 10 PM there are usually 2 shared bikes from Company A, 1 shared scooter from Company B, and 1 shared car from Company C within 200 m of the POI). In one instance, the UI module 207 enables the location-based user interface to provide for an interactive selection of shared vehicle types, shared vehicle operators, or a combination thereof. By way of example, once the UI module 207 surfaces the mobility insights to a user, the user may then select a shared vehicle based on a type (e.g., a shared car on a rainy evening), an operator (e.g., the user is only a member of Company B's service), etc. to streamline and/or more efficiently present the mobility insight data.

Figure 4:
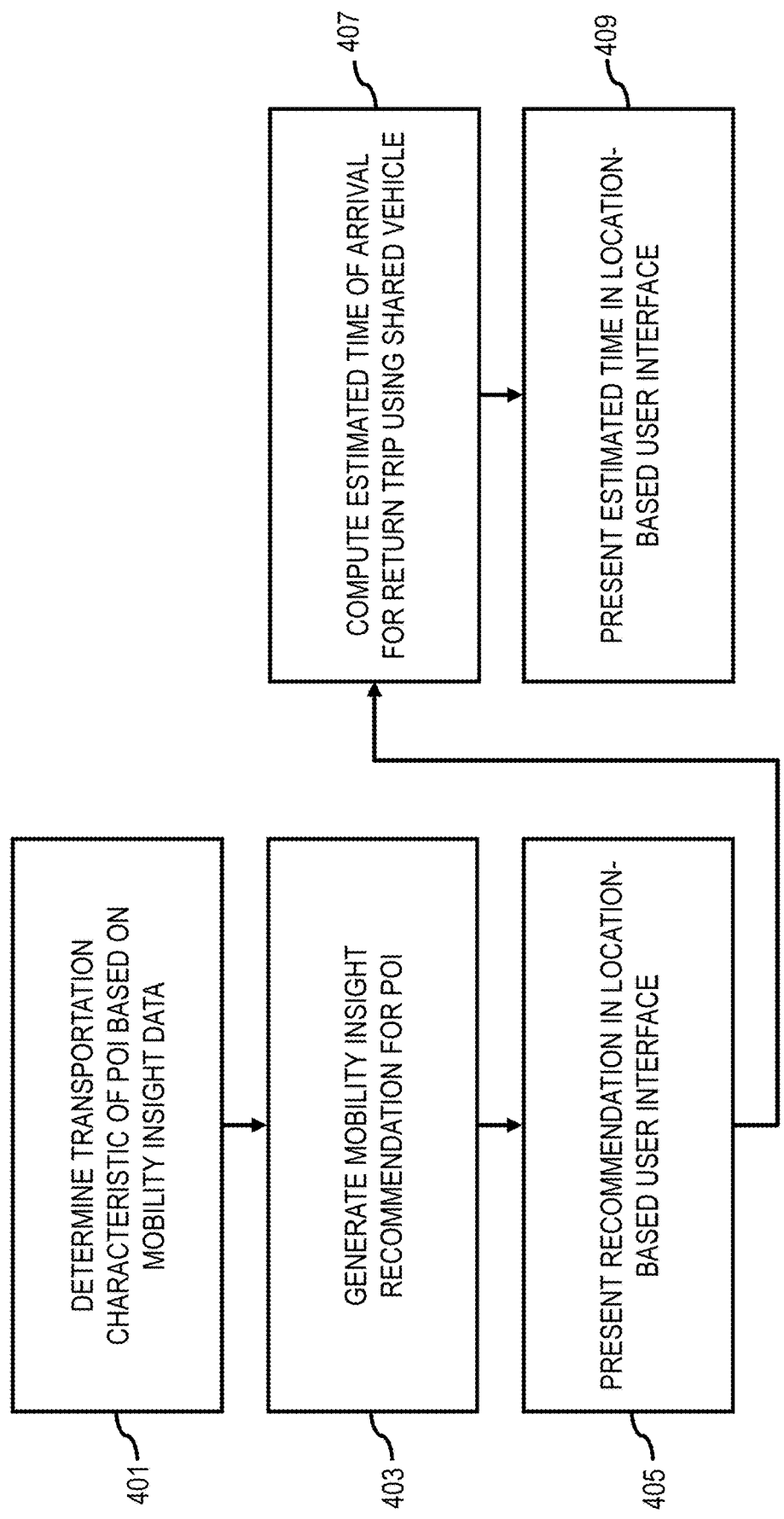
FIG. 4 is a flowchart of a process for providing mobility-based recommendations related to shared vehicles for a POI, according to one embodiment.

FIG. 4 is a flowchart of a process for providing mobility-based recommendations related to shared vehicles for a POI, according to one embodiment. In various embodiments, the mobility platform 105 and/or the modules 201-209 may perform one or more portions of the process 400 and may be implement in, for instance, a chip set including a processor and a memory as shown in FIG. 8. As such, the mobility platform 105 and/or modules 201-209 can provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 may be performed in any order or combination and need not include all of the illustrated steps. In one embodiment, the process 400 describes additional steps that can be performed in combination with the process 300 described above.

In step 401, the analysis module 209 determines at least one transportation characteristic of the POI based on the mobility insight data, wherein the at least one transportation characteristics includes at least one of: a reachability of the POI by public transportation; a difficulty of parking near the POI; and a level of shared vehicle service near the POI. By way of example, the reachability of the POI by public transportation may include factors such as whether or not any public transportation (e.g., a bus or a mass transit system) services the POI or the area that the POI is located within, the amount of time, the cost, or the number of stops, transfers etc. that a user would have to take to reach the POI by public transport. In one example, the difficulty of parking could include whether the POI has any off the street parking (e.g., a parking lot), whether there is any on street parking available, whether the parking is restricted by day or time (e.g., a 2-hour parking limit or no parking on Tuesdays), etc. By way of example, the level of shared vehicle service near the POI may include the number of shared bicycle docking stations near the POI, the number of shared vehicles being picked up or dropped off near the POI (i.e., checked-out or checked-in, respectively), etc. In one embodiment, the system 100 may use the level of shared vehicle service near a POI to rank POIs (e.g., in connection with recommending a POI to visit as described below in steps 403 and 405). It is contemplated that knowing how users go to a place may lead to users adapting their own mobility patterns. For example, a user may decide to travel via a shared bicycle to POI that is hard to reach by public transport and where there is a difficulty of parking near, but the ride to the POI is under 20 minutes.

In step 403, the analysis module 209 generates a recommendation of a shared vehicle type, a shared vehicle operator, or a combination thereof to use to travel to or from a POI based on mobility insight data; when to travel to the POI based on the mobility insight data; or a recommended POI to visit based on the mobility insight data. In one embodiment, the analysis module 209 can generate the recommendation based on at least one transportation characteristic of the POI determined by the analysis module 209, as described above in step 401. By way of example, the analysis module 209 could generate a recommendation that a user visit POI A rather than POI B based on knowing that there will unlikely be shared vehicles (e.g., shared cars) available until close at POI B, whereas there will likely be shared vehicles until close at POI A. In another instance, the analysis module 209 could generate a recommendation that if a user still wants to visit POI B, they should go at an earlier part of the evening since the availability of shared vehicles starts to significantly decrease starting at 9 PM, for example. Further, in one embodiment, the analysis module 209 could generate a recommendation that a user go to POI C rather POI D (e.g., both restaurants) because POI C has some (possibly sponsored) shared vehicles (e.g., cars/bikes, etc.) that are reserved for their customers to go home. For example, the reserved shared vehicles may be in a "reserved" or "paying" state by the POI owner and released for a specific customer when needed.

In one embodiment, the analysis module 209 may generate the recommendation based on a personal mobility graph, user registration with one or more shared vehicle operators, or a combination thereof associated with a user. By way of example, the analysis module 209 would be able to make even more relevant recommendations if it "knows" the user as it would be able to know which services the user is registered with (e.g., 2 bike sharing companies, 2 scooter sharing companies, and one car sharing company). In one embodiment, the analysis module 209 may generate the recommendation based on a combination of the mobility patterns of a given user and the mobility insight data for a POI. By way of example, the analysis module 209 may generate a recommendation of a POI (e.g., a restaurant) based on knowing how far the user usually travels to and from her or his house using public and/or shared transport. For example, the analysis module 209 could generate a recommendation for a new restaurant which is 25 minutes from the user's home by a shared bike and 15 minutes back by a shared scooter and knowing that there should be multiple shared scooters available at the time that user will want to leave the restaurant (e.g., the user never stays past 11:15 PM).

In step 405, the UI module 207 presents the recommendation to a user in the location-based user interface. By way of example, as discussed above, the location-based user interface may be a mapping application, a navigation application, a review or recommendation application, etc. available to a user on a UE such as a mobile device, a smart phone, a computer, etc. In one embodiment, like the presentation in step 305 described above, the UI module 207 can present the recommendation such that a user may make an interactive selection (e.g., make a reservation) of a shared vehicle type, a shared vehicle operator, or a combination thereof.

In step 407, wherein the data processing module 205 computes the insight data for a return trip from the POI, the analysis module 209 computes an estimated time of arrival for the return trip using a shared vehicle. In one embodiment, the data processing module 205 computes the insight data for a return trip from a POI when the data processing module 205 computes the insight data for going to the POI so that a user can make a more informed decision as to when to go to the POI, if at all. In step 409, the UI module 207 presents the estimated time of arrival to the user in the location-based user interface. By way of example, the UI module 207 can surface the fact that on the way back from the POI (e.g., a restaurant), there is a likelihood of taking a shared scooter (ETA 20 minutes) or a shared bike (ETA 30) given the availability of the shared vehicles in the proximity of the POI at the time that the user will be there. Again, in the instance where the analysis module 209 "knows" the registered shared vehicle services and/or shared vehicle preferences of the user, the UI module 209 can present the recommendations and/or estimated times of arrival to the user based on that knowledge for a more personalized presentation.

FIGS. 5A through 5H are diagrams of example user interfaces for providing mobility insight data and/or mobility related recommendations related to shared vehicles for POIs, according to one embodiment. In this example, a location-based UI 501 (e.g., a review or recommendation application) is generated for a UE 111 (e.g., a mobile device) that can assist a user decide when and where to go for dinner. For example, the user may want to go to dinner with one or more colleagues after they finish their group project; however, because they are uncertain when they may finish, they want to try to avoid being restricted by the public transit network (e.g., specific arrival and departure times).

Figure 5A:
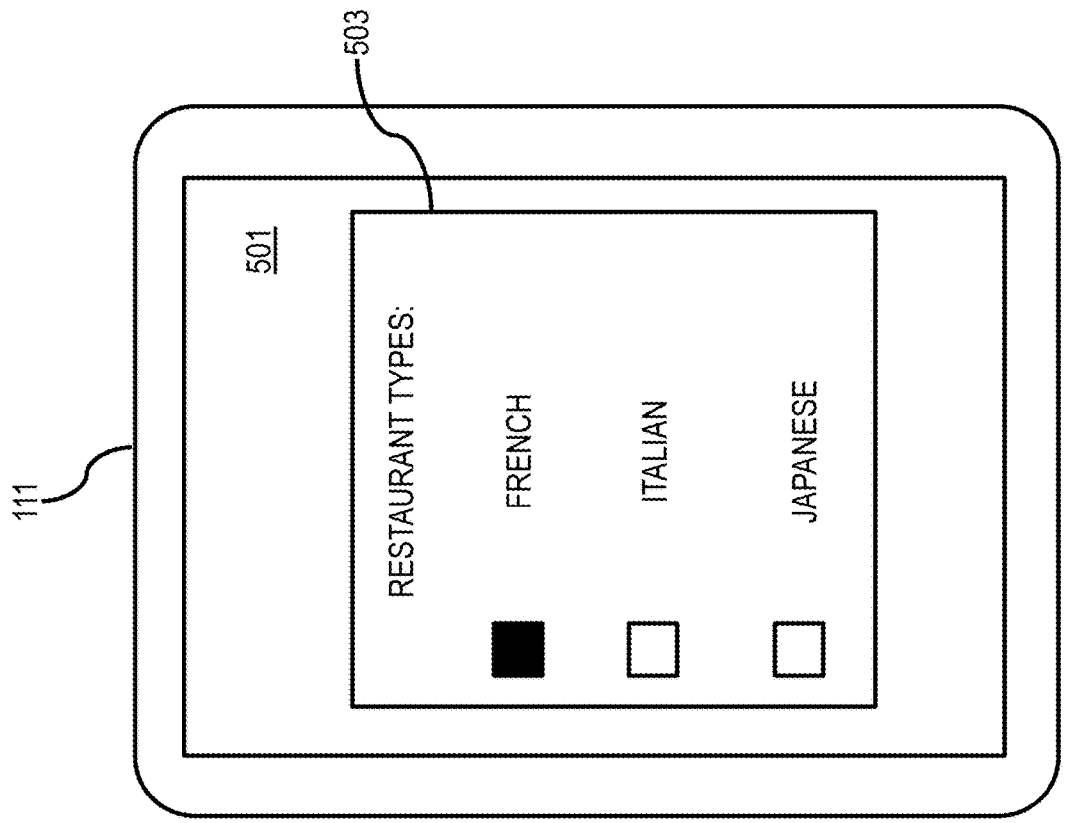
FIGS. 5A through 5H are diagrams of example user interfaces for providing mobility insight data and mobility related recommendations related to shared vehicles for POIs, according to one embodiment.

In this example use case, the user is interested to try a new type of restaurant but is wondering how she or he will go from where they are (e.g., at work) and then back home from the restaurant and, therefore, wants to make her or his decision largely based on available transportation options. Referring to FIG. 5A, in one embodiment, the UI 501 includes an input 503 to enable a user to filter among possible POIs (e.g., a restaurant, a sporting or entertainment venue, a theater, etc.). In this instance, the input 503 can enable the user to filter among various restaurant types (e.g., French, Italian, and Japanese).

Figure 5B:
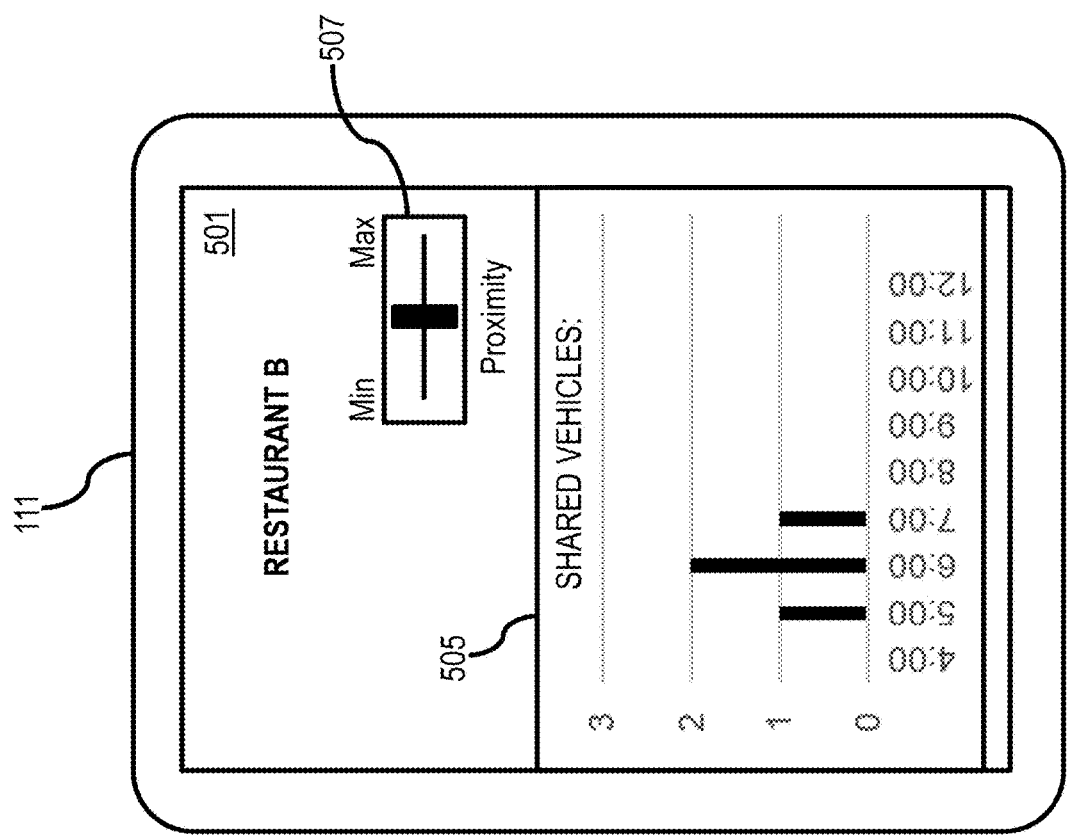
Figure 5C:
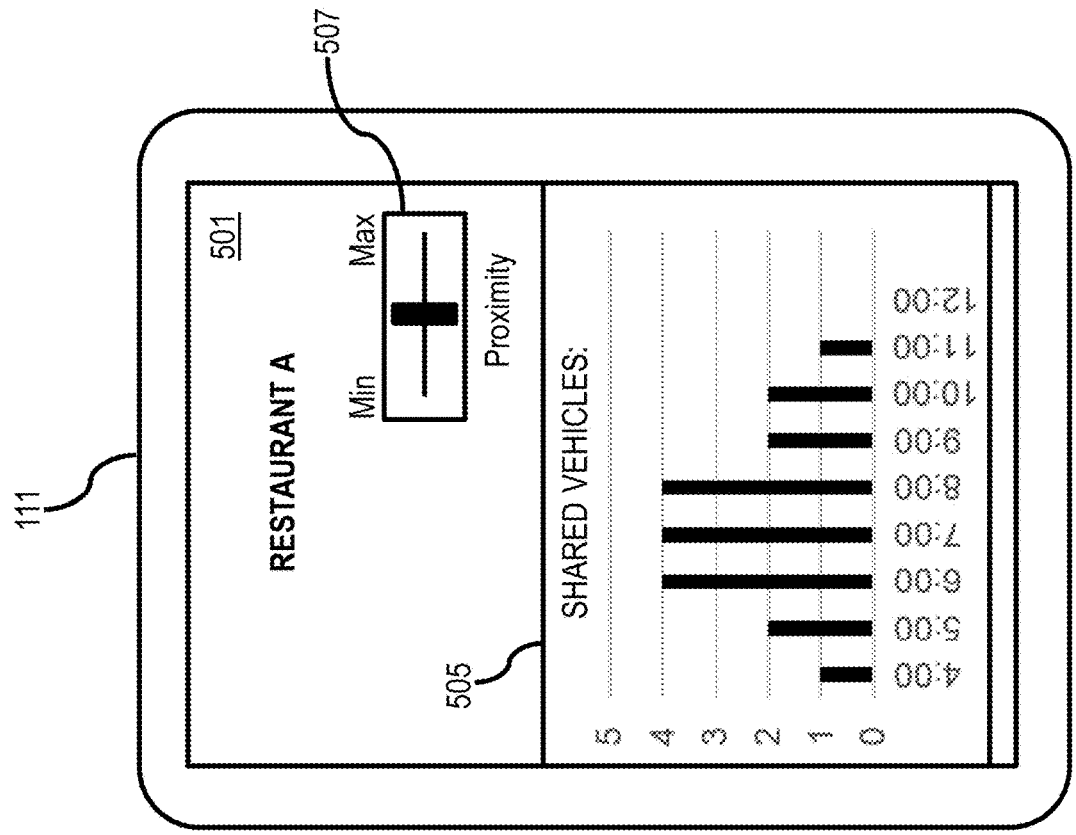
Figure 5E:
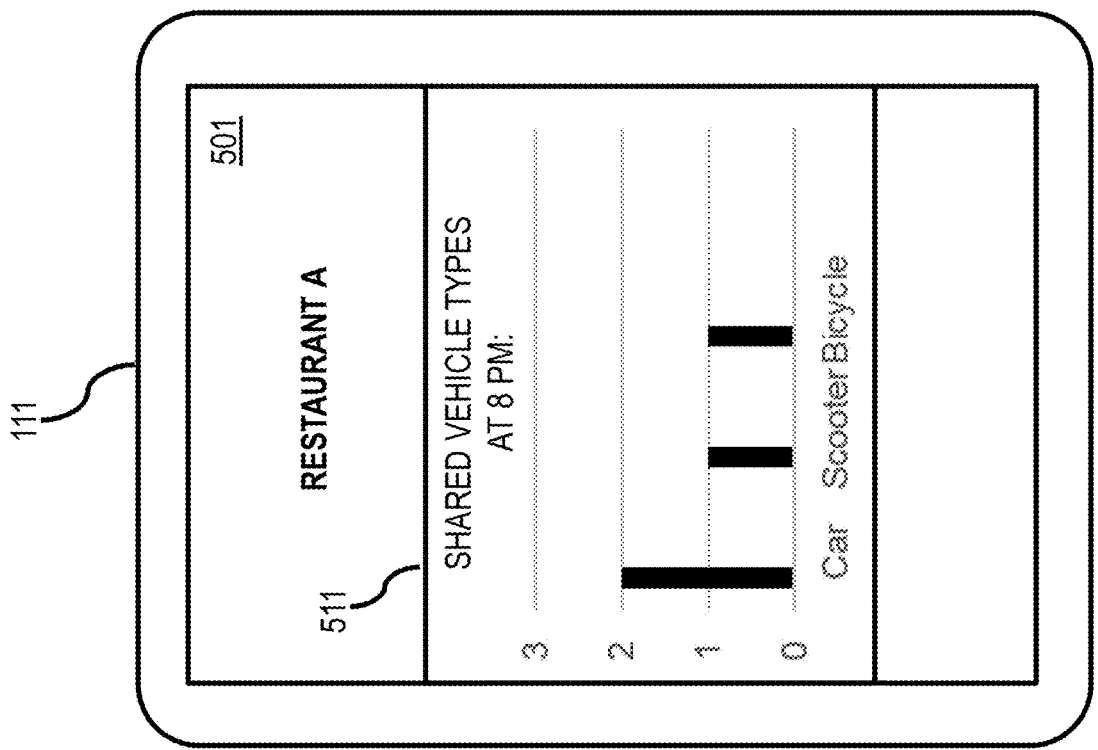

In one embodiment, once the user selects a restaurant type (e.g., French), the system 100 retrieves shared vehicle data (e.g., historical data and/or real-time information) for the responsive POIs. In this example, there are two restaurants that are responsive to the selection (e.g., restaurant A and restaurant B), as depicted in FIGS. 5B and 5C, respectively. By way of example, the shared vehicle data may be based on shared cars, shared bicycles, shared scooters, etc. and the shared cars may be standard vehicles, autonomous vehicles, semi-autonomous vehicles, or a combination thereof. In one instance, the system 100 can retrieve the shared vehicle data from information or data stored in or accessible via a geographic database (e.g., the geographic database 109), a digital map, or a combination thereof.

In one instance, the system 100 processes the shared vehicle data to determine mobility insight data related to shared vehicles for each POI (e.g., restaurant A and restaurant B). In this example, the system 100 determines the mobility insight data related to the number of shared vehicles (e.g., cars, scooters, bicycles, etc.) relative to each POI between the hours of 4:00 PM and 12:00 PM based on the historical shared data retrieved by the system 100. In one embodiment, the system 100 then presents or surfaces the processed mobility insight data to the user in the location-based UI 501. Specifically, in this example, the system 100 surfaces the mobility insight data in respective "Shared Vehicle" windows 505. Specifically, the system 100 may present the mobility insight data to the user as a distribution graph.

In this example, a user can see that the number of shared vehicles within a threshold proximity to restaurant A (e.g., within a 10-minute walk) begins around 4:00 PM, increases until 6:00 PM, remains at a peak between 6:00 PM and 8:00 PM, and then decreases until there are no longer any shared vehicles in the vicinity at or around 12:00 PM. In contrast, the user can see that the number of shared vehicles within a threshold proximity to restaurant B (e.g., within a 10-minute walk) begins at 5:00 PM, increases to a peak at 6:00 PM, and then decreases until there are no longer any shared vehicles in the vicinity after 7:00 PM. Based on surfaced mobility insight data, the user can infer that the level of shared vehicle service is much greater for restaurant A than restaurant B and, therefore, the users individually or collectively have a much greater chance of getting a shared vehicle when they finish their meal at restaurant A. In addition, the user may also be able to infer from the surfaced mobility insight data that restaurant A is harder to reach by public transport and restaurant B is likely closer to public transport (e.g., a city center), hence the lack of shared vehicles. Given the user's desire to avoid the restrictions of the public transport network, she or he can see that restaurant A is a better fit for her or his purposes.

In one embodiment, the location-based UI 501 may include an input 507 to enable a user to adjust or modify the threshold proximity and, therefore, the number of the shared vehicle events that the system 100 is retrieving and processing. For example, in this instance, the threshold proximity may be limited to shared vehicles that are reachable within a 10-minute walk to the POI; however, the user may want to see the results with respect to a 5-minute walk or a 20-minute walk, for example.

Figure 5D:
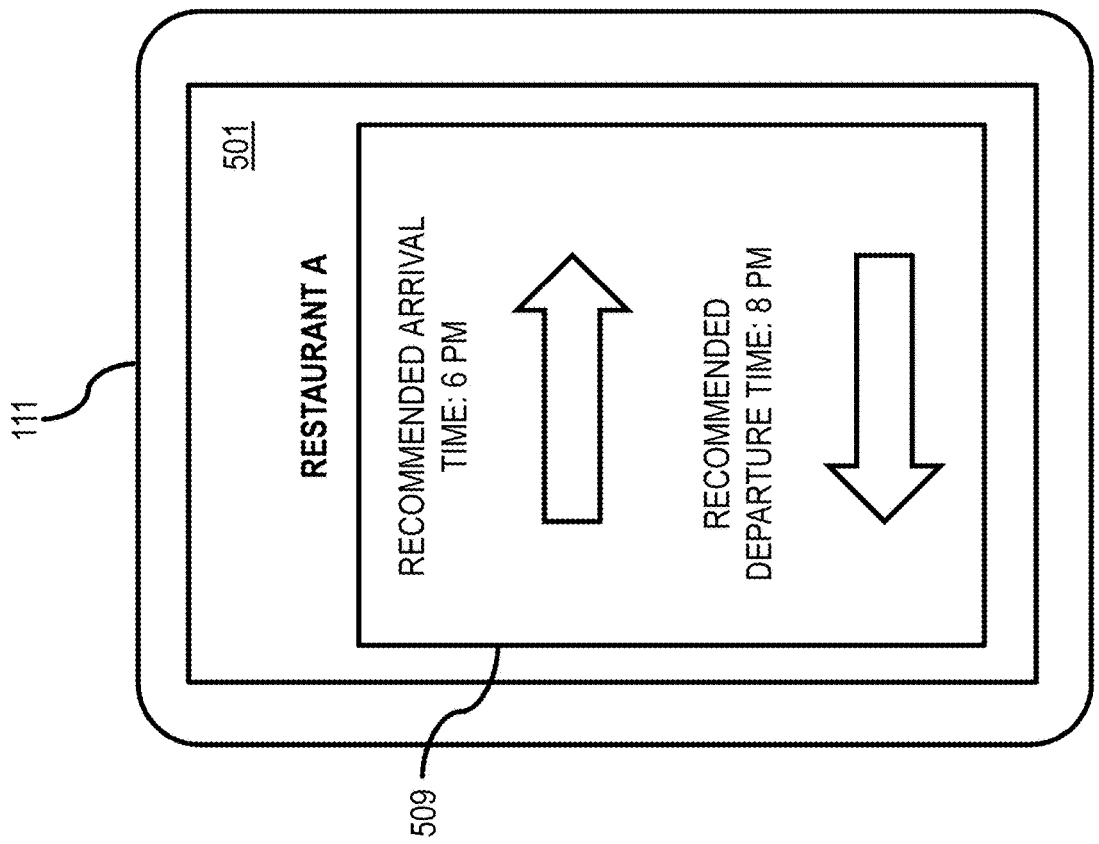

In one embodiment, once the user selects the POI that she or he would like to go to (e.g., restaurant A), the system 100 can generate a recommendation as to when the user should travel to the POI based on the mobility insight data (e.g., "Recommend Arrival Time: 6 PM") as well as a recommendation as to when the user should leave the POI based on the mobility insight data (e.g., "Recommend Departure Time: 8 PM"), as depicted in the window 509 of FIG. 5D. In this example, the recommendation may be based on a likelihood of multiple shared vehicles being near restaurant A when the users finish their meal. In another example, the recommendation may be based on the likelihood of a specific type of shared vehicle (e.g., a shared car, an automatic transmission shared car, a shared car registered with Company A, etc.) being near restaurant A when the users finish their meal.

In one embodiment, the system 100 can generate an interactive location-based UI 501 so that a user may view the mobility insight data at various levels of detail. By way of example, a user may want to see the number of shared vehicles that are likely near the POI at a given time as well as the types of shared vehicles and/or the number of shared vehicles registered with a specific shared vehicle operator. In one instance, the system 100 can enable a user to select or to interact each column of the window 505 of the UI 501 so that a user can discover the shared vehicle type, the shared vehicle operator, or a combination thereof, as depicted in the window 511 of FIG. 5E. In this instance, the user can see in the "Shared Vehicle Types" window 511 that there are likely 2 shared cars, 1 shared scooter, and 1 shared bicycle based on the retrieved historical shared vehicle data. In one example, the users may decide or the system 100 may recommend which of the shared vehicles to take home based on the proximity of their respective homes to the restaurant A. For example, a user that lives nearby may take the shared scooter or the shared bike or the system 100 may recommend such knowing the location of the user's home. Likewise, a user that lives further away may take one of the shared cars or the system 100 may recommend such knowing the location of the user's home. In another instance, the users may decide or the system 100 may recommend which of the shared vehicles to take based on their respective registrations (if any) with one or more shared vehicle operators. For example, the system 100 may recommend that the user that is only registered with one operator take the shared vehicle that corresponds to her or his registration and then the system 100 can recommend one or more shared vehicles to the remaining users that each have multiple registrations. In one embodiment, like the way that a user was able to select or to interact with the 8:00 PM column of the window 505, the system 100 can also enable a user to interact or to select the shared car column of window 511 to view additional details regarding the type, the operator, etc. for each shared vehicle.

Figure 5G:
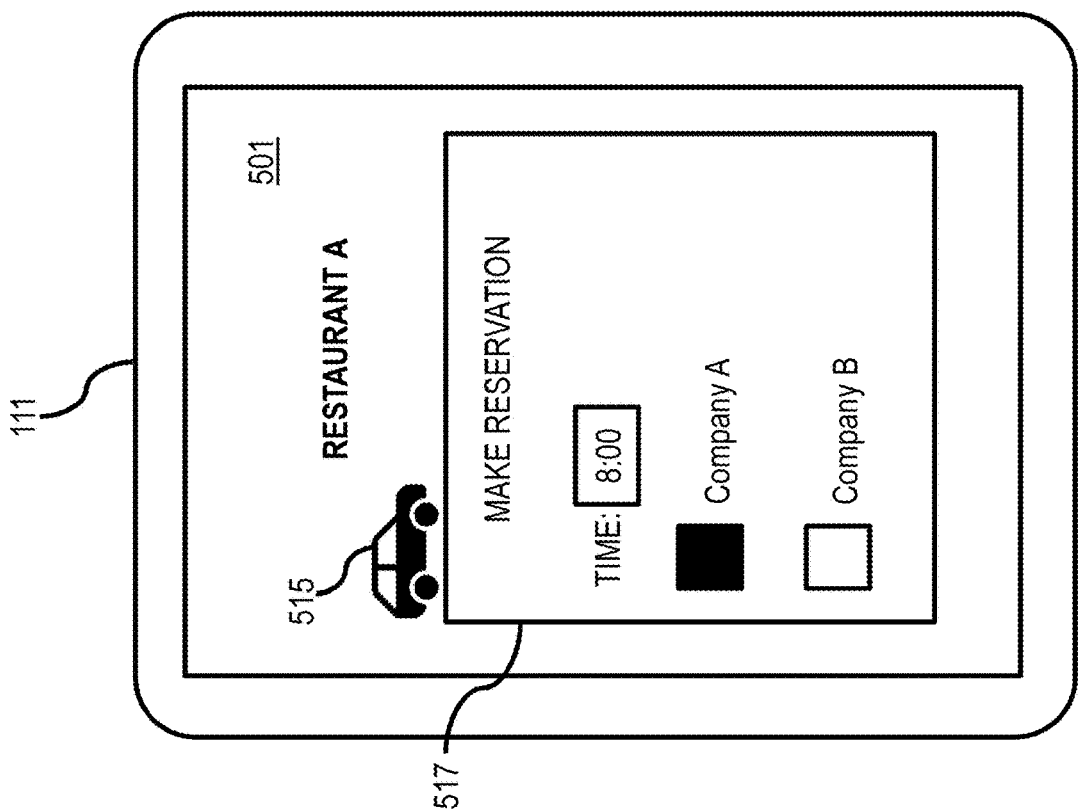
Figure 5F:
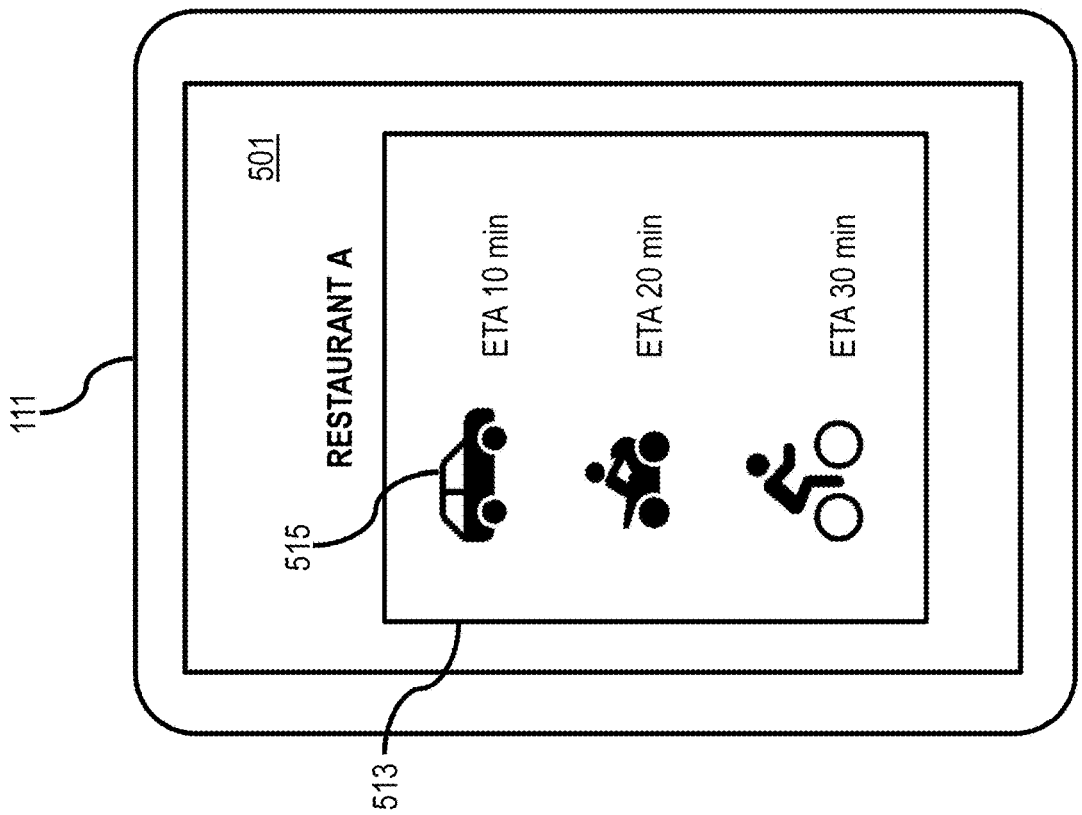

In one embodiment, the system 100 can compute the estimated time for the return trip using a shared vehicle and can present or surface the estimated time of arrival in the location-based UI 501, as depicted in the window 513 of FIG. 5F. In one instance, it is contemplated that the system 100 can provide some level of interactivity with the estimated time of arrival. For example, a user may select the shared vehicle icon 515 to see how different types of routes may potentially affect her or his estimated time of arrival (e.g., taking a tollfree route versus taking a toll route).

In one instance, as shown in FIG. 5G, the system 100 can present a "Make Reservation" window 517 in the UI 501 in response to a selection or an interaction with the shared vehicle icon (e.g., icon 515) by a user. For example, the system 100 can enable a user to manually select the time and the shared vehicle operator that she or he wishes to take. In another instance, the system 100 may prepopulate the time and the shared vehicle operator based on the personal mobility graph of the user, a user's registration with one or more shared vehicle operators, or a combination thereof. In one embodiment, the system 100 may prepopulate the time and shared vehicle based on the mobility patterns of the user. For example, a user may generally use the shared vehicles of Company A during the day and weekdays and generally use the shared vehicles of Company B during the night and weekends based on a difference in cost at such times. Therefore, in one instance, the system 100 can generate a recommendation of the shared vehicle operator based on the day and time that a user is interested in getting a shared vehicle. In one embodiment, the system 100 can also present the cost of the intended travel to the user, which in some instances may cause the user to select another form of travel (e.g., changing from a shared car to a shared scooter or shared bike or vice versa if the difference in cost is nominal).

Figure 5H:
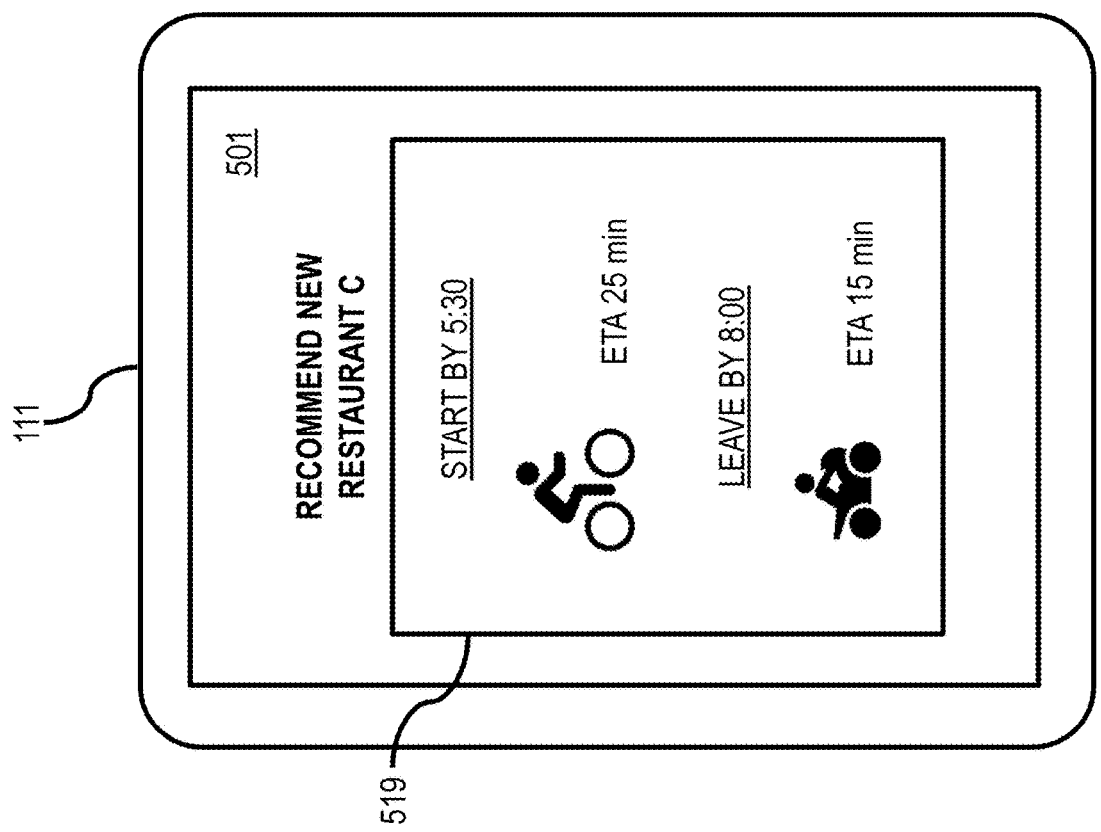

Referring to FIG. 5H, in one embodiment, rather than retrieving shared vehicle data based on a selection of a POI type by a user (e.g., French), the system 100 can recommend a POI (e.g., a new restaurant) based on the mobility patterns of a user and shared vehicle data within a threshold proximity of a POI. In one instance, the system 100 can retrieve both the mobility pattern data of a user and the shared vehicle data (e.g., historical data and/or real-time information) from information or data stored in or accessible via a geographic database (e.g., the geographic database 109). In this example use case, the user generally uses public transport (e.g., a bus or a subway), hence the regular places that she or he or visits are in the vicinity of public transport stations. By way of example, the places may be within a 5-minute walk of such stations during weekdays and a 10-minute walk during weekends. In one embodiment, the system 100 could suggest new places to the user based on the user's general mobility patterns (e.g., the user travels a maximum of 25 minutes to and from a place using public transportation). In one instance, the system 100 could recommend a new restaurant (e.g., restaurant C) which is 25 minutes from the user's home by shared bike and 15 minutes back by shared scooter since the system 100 knows that there is a likelihood of shared scooters being available at the time the user usually leaves (e.g., never after 11:15). In one embodiment, the system 100 can recommend a time to start traveling to the restaurant C (e.g., 5:30) based on the computed ETA (e.g., 25 minutes) and the distributions of shared vehicle availability for the POI (e.g., leave by 8:00) to ensure that the user is able to get home within the same time that she or he usually takes to get home using public transportation. As described above, in one embodiment, the system 100 can generate a location-based user interface 501 that enables various user interactions with the window 519 and/or icons within so that the user can obtain or discover different degrees of information as well as make a reservation for a shared vehicle on the return trip home, for example.

Returning to FIG. 1, in one embodiment, the UEs 111 can be associated with any of the vehicles 101 (e.g., a shared vehicle) or a person traveling within a vehicle 101. By way of example, the UEs 111 can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that a UE 111 can support any type of interface to the user (such as "wearable" circuitry, etc.). In one embodiment, the vehicles 101 may have cellular or wireless fidelity (Wi-Fi) connection either through the inbuilt communication equipment or from a UE 111 associated with the vehicles 101. Also, the UEs 111 may be configured to access the communication network 107 by way of any known or still developing communication protocols. In one embodiment, the UEs 111 may include the mobility platform 105 to provide mobility insight data related to shared vehicles for a POI.

In one embodiment, the mobility platform 105 performs the process for providing mobility insight data related to shared vehicles for a POI as discussed with respect to the various embodiments described herein. In one embodiment, the mobility platform 105 can be a standalone server or a component of another device with connectivity to the communication network 107. For example, the component can be part of an edge computing network where remote computing devices (not shown) are installed along or within proximity of an intended destination (e.g., a city center).

In one embodiment, the mobility platform 105 has connectivity over the communication network 107 to the services platform 115 (e.g., an OEM platform) that provides one or more services 117a-117n (also collectively referred to herein as services 117) (e.g., traffic/routing services). By way of example, the services 117 may also be other third-party services and include mapping services, navigation services, travel planning services, reservation services (e.g., booking a shared vehicle 101), notification services, social networking services, content (e.g., audio, video, images, etc.) provisioning services, application services, storage services, contextual information determination services, location-based services, information-based services (e.g., weather, news, etc.), etc. By way of example, the services 117 may be online services that reflect interests, recommendations, reviews, and/or activities of users. In one instance, the services 117 provide representations of each user (e.g., a profile), his/her social links, and a variety of additional information. In one instance, the services 117 can allow users to share location information, activities information, POI related information, contextual information, and interests within their individual networks, and provides for data portability.

In one embodiment, content providers 119a-19n (also collectively referred to herein as content providers 119) may provide content or data (e.g., navigation-based content such as destination information, routing instructions, POI related data, historical data; shared vehicle content such as vehicle type, vehicle operator; etc.) to the vehicles 101, the mobility platform 105, the geographic database 109, the UEs 111, the applications 113, the services platform 115, and the services 117. The content provided may be any type of content, such as map content, contextual content, audio content, video content, image content, etc. In one embodiment, the content providers 119 may also store content associated with the vehicles 101, the mobility platform 105, the geographic database 109, the UEs 111, the applications 113, the services platform 115, and/or the services 117. In another embodiment, the content providers 119 may manage access to a central repository of data, and offer a consistent, standard interface to data, such as a repository of the geographic database 109.

By way of example, as previously stated the vehicle sensors 103 may be any type of sensor. In certain embodiments, the vehicle sensors 103 may include, for example, a global positioning sensor (GPS) for gathering location data, a network detection sensor for detecting wireless signals or receivers for different short-range communications (e.g., Bluetooth, Wi-Fi, light fidelity (Li-Fi), near field communication (NFC) etc.), temporal information sensors, a camera/imaging sensor for gathering image data (e.g., lights or exhaust associated with a shared vehicle 101 that is no longer available for use (i.e., checked-out)), velocity sensors, and the like. In another embodiment, the vehicle sensors 103 may include sensors (e.g., mounted along a perimeter of the vehicle 101) to detect the relative distance of the vehicle from lanes or roadways, the presence of other vehicles 101, pedestrians, animals, traffic lights, road features (e.g., curves) and any other objects, or a combination thereof. In one scenario, the vehicle sensors 103 may detect weather data, traffic information, or a combination thereof. In one example embodiment, the vehicles 101 may include GPS receivers to obtain geographic coordinates from satellites 121 for determining current or live location and time. Further, the location can be determined by a triangulation system such as A-GPS, Cell of Origin, or other location extrapolation technologies when cellular or network signals are available. In another example embodiment, the services 117 may provide in-vehicle navigation services.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the mobility platform 105 may be a platform with multiple interconnected components. By way of example, the mobility platform 105 may include multiple servers, intelligent networking devices, computing devices, components and corresponding software for providing mobility insight data related to shared vehicles for a POI. In addition, it is noted that the mobility platform 105 may be a separate entity of the system 100, a part of the services platform 115, the one or more services 117, or the content providers 119.

In one embodiment, the geographic database 109 stores information regarding one or more shared vehicle events that have occurred within a threshold proximity of a POI, one or more mobility patterns or mobility graphs associated with a user, one or more user registrations with one or more shared vehicle operators, or a combination thereof. In one instance, the geographic database 109 can also store defined geofenced areas, static squared areas, slightly overlapping circles, or a combination thereof around a POI. The information may be any of multiple types of information that can provide means for providing mobility insight data related to shared vehicles for a POI. In another embodiment, the geographic database 109 may be in a cloud and/or in a vehicle 101, a UE 111, or a combination thereof.

By way of example, the vehicles 101, the mobility platform 105, the geographic database 109, the UEs 111, the applications 113, the services platform 115, the services 117, the content providers 119, and the satellites 121 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 6:
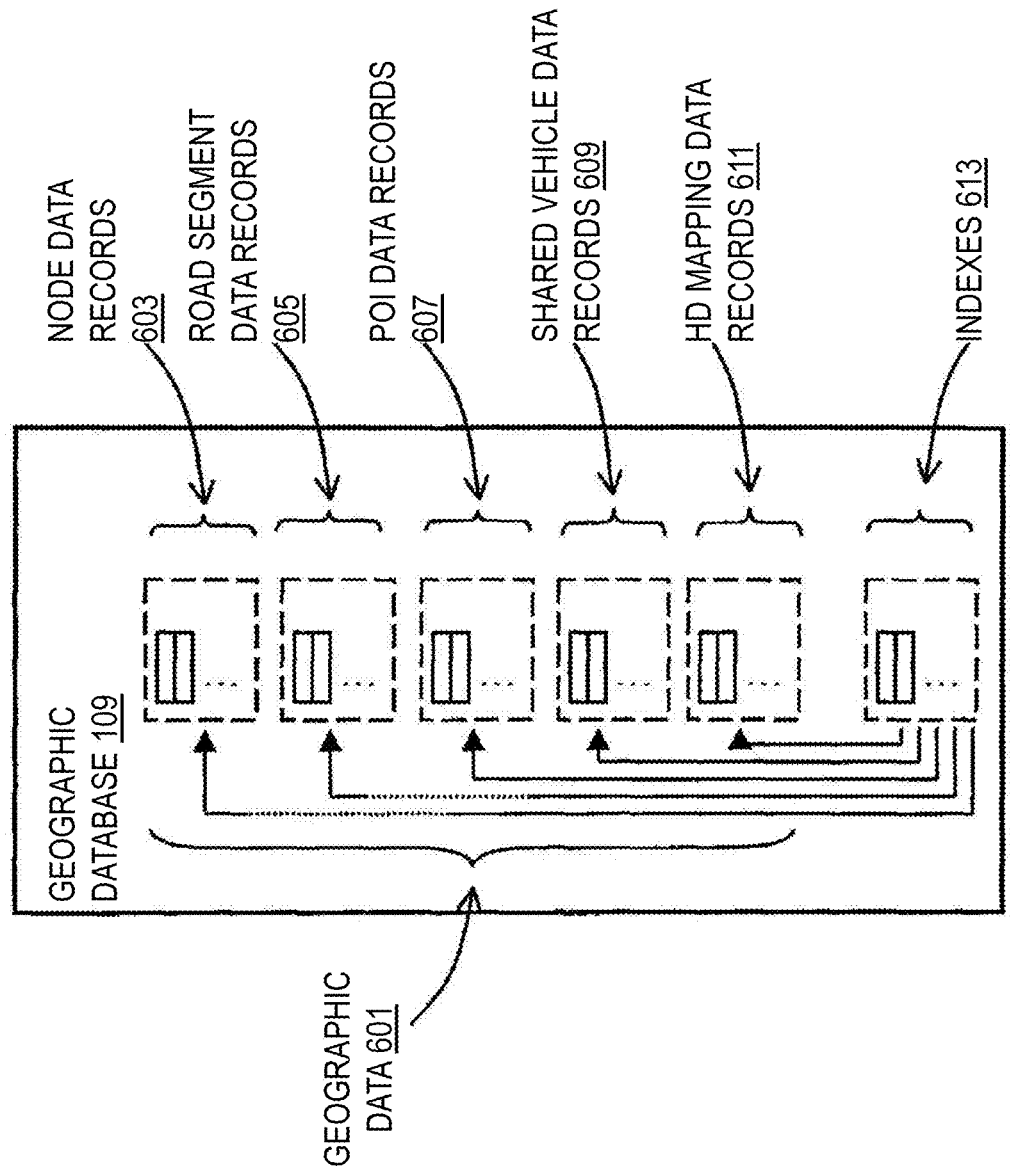
FIG. 6 is a diagram of a geographic database, according to one embodiment.

FIG. 6 is a diagram of a geographic database, according to one embodiment. In one embodiment, geographic database 109 includes geographic data 601 used for (or configured to be compiled to be used for) mapping and/or navigation-related services, such as for video odometry based on the mapped features, e.g., lane lines, road markings, signs, etc. In one embodiment, geographic database 109 includes high resolution or high definition (HD) mapping data that provide centimeter-level or better accuracy of map features. For example, geographic database 109 can be based on Light Detection and Ranging (LiDAR) or equivalent technology to collect billions of 3D points and model road surfaces and other map features down to the number lanes and their widths. In one embodiment, the HD mapping data, e.g., HD mapping data records 611, capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features, e.g., two-dimensional or three-dimensional features, are represented using polygons, e.g., two-dimensional features, or polygon extrusions, e.g., three-dimensional features. For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in geographic database 109.

"Node"—A point that terminates a link.

"Line segment"—A straight line connecting two points.

"Link" (or "edge")—A contiguous, non-branching string of one or more-line segments terminating in a node at each end.

"Shape point"—A point along a link between two nodes, e.g., used to alter a shape of the link without defining new nodes.

"Oriented link"—A link that has a starting node (referred to as the "reference node") and an ending node (referred to as the "non-reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary, e.g., a hole or island. In one embodiment, a polygon is constructed from one outer simple polygon and none or at least one inner simple polygon. A polygon is simple if it just consists of one simple polygon, or complex if it has at least one inner simple polygon.

In one embodiment, geographic database 109 follows certain conventions. For example, links do not cross themselves and do not cross each other except at a node. Also, there are no duplicated shape points, nodes, or links. Two links that connect each other have a common node. In geographic database 109, overlapping geographic features are represented by overlapping polygons. When polygons overlap, the boundary of one polygon crosses the boundary of the other polygon. In geographic database 109, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, geographic database 109 includes node data records 603, road segment or link data records 605, POI data records 607, shared vehicle data records 609, HD mapping data records 611, and indexes 613, for example. More, fewer or different data records can be provided. In one embodiment, additional data records (not shown) can include cartographic ("carto") data records, routing data, and maneuver data. In one instance, the additional data records (not shown) can include user mobility pattern data. In one embodiment, the indexes 613 may improve the speed of data retrieval operations in geographic database 109. In one embodiment, the indexes 613 may be used to quickly locate data without having to search every row in geographic database 109 every time it is accessed. For example, in one embodiment, the indexes 613 can be a spatial index of the polygon points associated with stored feature polygons.

In exemplary embodiments, the road segment data records 605 are links or segments representing roads, streets, or paths, as can be used in the calculated route or recorded route information for determination of one or more personalized routes, an estimated time of arrival, or a combination thereof. The node data records 603 are end points corresponding to the respective links or segments of the road segment data records 605. The road link data records 605 and the node data records 603 represent a road network, such as used by vehicles, cars, and/or other entities. Alternatively, geographic database 109 can contain path segment and node data records or other data that represent pedestrian paths, bicycle paths, or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 109 can include data about the POIs and their respective locations in the POI data records 607. In one instance, the POI data records 607 can include information regarding popular times at a POI, how long people typically spend at a POI, opening and closing times of a POI, etc. The geographic database 109 can also include data about places, such as cities, towns, or other communities, and other geographic features, such as bodies of water, mountain ranges, etc. Such place or feature data can be part of the POI data records 607 or can be associated with POIs or POI data records 607 (such as a data point used for displaying or representing a position of a city).

In one embodiment, the geographic database 109 can also include shared vehicle data records 609. By way of example, the shared vehicle data records 609 may include when and where a shared vehicle is taken (i.e., checked-out) within a geofenced or defined area, when and where the shared vehicle is released (i.e., checked-in), how long the shared vehicle stayed at a given location within a threshold proximity to the POI; and/or a correlation to a contextual parameter (e.g., weather, time of day, etc.). In one instance, the shared vehicle data records 609 may include vehicle operator information. In another embodiment, the shared vehicle data records 609 stores information relating to the one or more shared vehicles, e.g., vehicle type, vehicle features, reservation cost information, etc. By way of example, the shared vehicle data records 609 can be associated with one or more of the node data records 603, road segment data records 605, and/or POI data records 607 to support localization and opportunistic use of the shared vehicles during navigation.

In one embodiment, as discussed above, the HD mapping data records 611 model road surfaces and other map features to centimeter-level or better accuracy. The HD mapping data records 611 also include lane models that provide the precise lane geometry with lane boundaries, as well as rich attributes of the lane models. These rich attributes include, but are not limited to, lane traversal information, lane types, lane marking types, road signs, lane level speed limit information, and/or the like. In one embodiment, the HD mapping data records 611 are divided into spatial partitions of varying sizes to provide HD mapping data to the UEs 111 or the vehicles 101 with near real-time speed without overloading the available resources of the UEs 111 and/or the vehicles 101, e.g., computational, memory, bandwidth, etc. resources.

In one embodiment, the HD mapping data records 611 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 611.

In one embodiment, the HD mapping data records 611 also include real-time sensor data collected from probe vehicles in the field. The real-time sensor data, for instance, integrates real-time traffic information, weather, and road conditions, e.g., potholes, road friction, road wear, etc., with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, geographic database 109 can be maintained by a content provider 119 in association with the services platform 115, e.g., a map developer. The map developer can collect geographic data to generate and enhance geographic database 109. There can be different ways used by the map developer to collect data. These ways can include obtaining data from other sources, such as municipalities or respective geographic authorities. In addition, the map developer can employ field personnel to travel by vehicle (e.g., a vehicle 101) and/or travel with a UE 111 along roads throughout the geographic region to observe features and/or record information about them, for example. Also, remote sensing, such as aerial or satellite photography, can be used (e.g., using one or more satellites 121).

The geographic database 109 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a shared vehicle 101 or a UE 111, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing mobility insight data related to shared vehicles for a POI (e.g., in a geofenced or defined area around the POI) may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
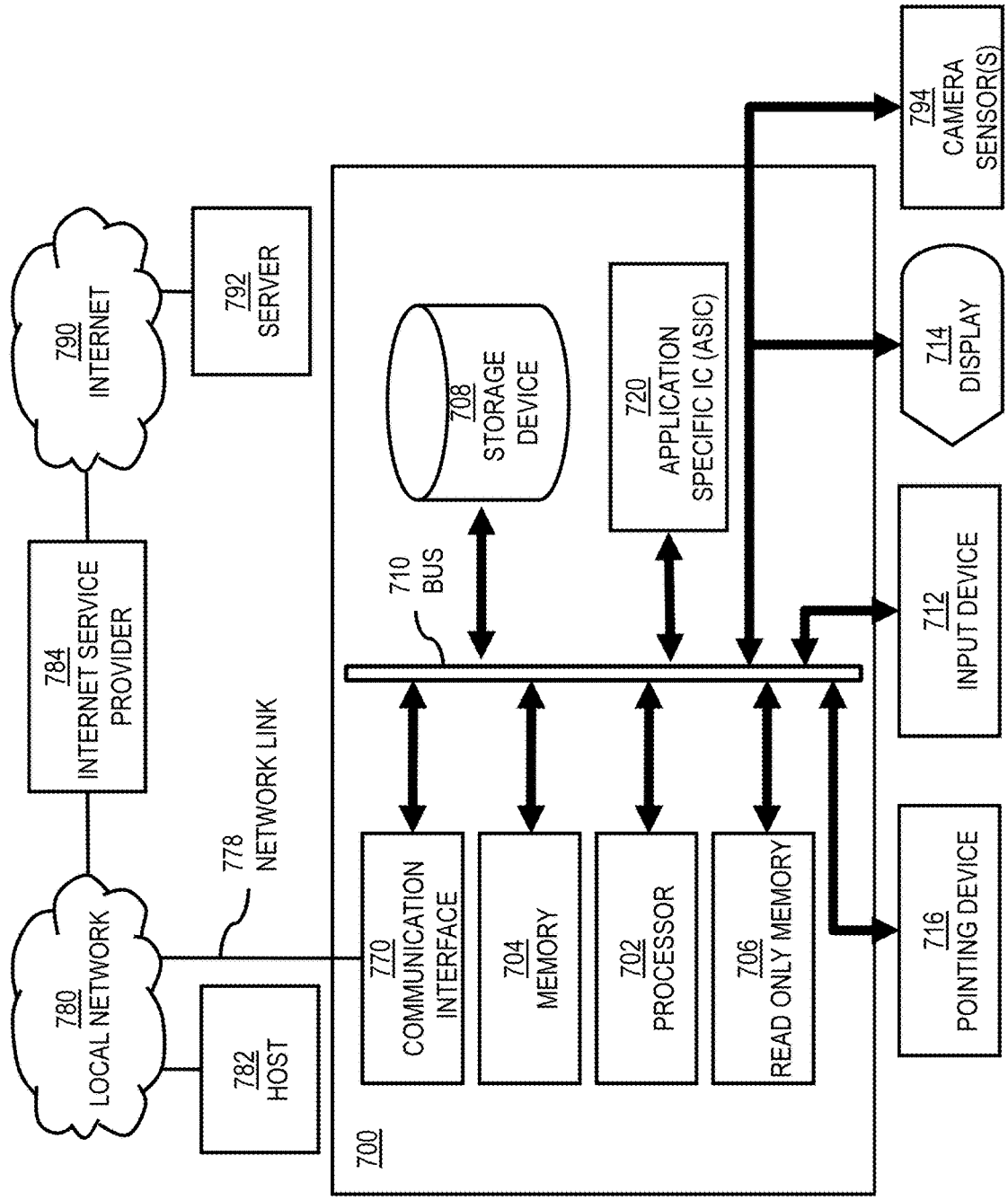
FIG. 7 is a diagram of hardware that can be used to implement an embodiment of the invention.

FIG. 7 illustrates a computer system 700 upon which an embodiment of the invention may be implemented. Computer system 700 is programmed (e.g., via computer program code or instructions) to provide mobility insight data related to shared vehicles for a POI as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to providing mobility insight data related to shared vehicles for a POI. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random-access memory (RANI) or other dynamic storage device, stores information including processor instructions for providing mobility insight data related to shared vehicles for a POI. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing mobility insight data related to shared vehicles for a POI, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general, the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 107 for providing mobility insight data related to shared vehicles for a POI.

The term non-transitory computer-readable medium is used herein to refer to any medium that participates in providing information to processor 702, including instructions for execution. Such a medium may take many forms, including, but not limited to, non-volatile media, volatile media and transmission media. Non-volatile or non-transitory media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

In one embodiment, a non-transitory computer-readable storage medium carrying one or more sequences of one or more instructions (e.g., computer code) which, when executed by one or more processors (e.g., a processor as described in FIG. 5), cause an apparatus (e.g., the vehicles 101, the UEs 105, the mobility platform 105, etc.) to perform any steps of the various embodiments of the methods described herein.

FIG. 8 illustrates a chip set 800 upon which an embodiment of the invention may be implemented. Chip set 800 is programmed to provide mobility insight data related to shared vehicles for a POI as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide mobility insight data related to shared vehicles for a POI. The memory 805 also stores the data associated with or generated by the execution of the inventive steps.

FIG. 9 is a diagram of exemplary components of a mobile terminal 901 (e.g., handset or vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions that offer automatic contact matching. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, code division multiple access (CDMA), WiFi, satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile station 901 to provide mobility insight data related to shared vehicles for a POI. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable non-transitory computer readable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile station 901 on a radio network. The card 949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising:
retrieving shared vehicle data for a point of interest (POI), wherein the shared vehicle data indicates one or more shared vehicle events within a threshold proximity of the POI;
processing the shared vehicle data to determine mobility insight data, wherein the mobility insight data includes a shared vehicle usage pattern, a shared vehicle availability pattern, or a combination thereof for travel to or from the POI;
generating a navigation route to the POI based on the mobility insight data;
providing an option in the user interface to make a reservation for the use of one or more shared vehicles; and
prepopulating one or more parameters of the reservation based on a mobility graph, a registration with one or more shared vehicle operators, or a combination thereof.

2. The method of claim 1, wherein the navigation route comprises a use of the one or more shared vehicles.

3. The method of claim 2, further comprising:
presenting the navigation route in a user interface of a device.

4. The method of claim 3, further comprising:
calculating a cost for the use of the one or more shared vehicles for the navigation route; and
presenting the cost in the user interface.

5. The method of claim 2, further comprising:
determining via an interaction with the user interface to select a type, an operator, or combination thereof of the one or more shared vehicle, wherein the navigation route is further based on the selected type, the selected operator, or a combination thereof.

6. The method of claim 1, further comprising:
generating an estimated time of arrival for travel to or from the POI based on the use of the one or more shared vehicles; and
presenting the estimated time of arrival as an output.

7. The method of claim 1, further comprising:
generating an estimated time of arrival for travel to or from the POI based on the mobility insight data; and
presenting the estimated time of arrival as an output.

8. The method of claim 1, wherein the one or more shared vehicle events include a when a shared vehicle is checked-out, where the shared vehicle is checked-out, when a shared vehicle is checked-in, where the shared vehicle is checked-in, how long the shared vehicle stayed at a location with the threshold proximity of the POI, or a combination thereof.

9. An apparatus comprising:
at least one processor; and
at least one memory including computer program code for one or more programs,
the at least one memory and the computer program code configured to, with the at least one processor, cause the apparatus to perform at least the following,
retrieve shared vehicle data for a point of interest (POI), wherein the shared vehicle data indicates one or more shared vehicle events within a threshold proximity of the POI;
process the shared vehicle data to determine mobility insight data, wherein the mobility insight data includes a shared vehicle usage pattern, a shared vehicle availability pattern, or a combination thereof for travel to or from the POI; and
generate a navigation route to the POI based on the mobility insight data;
provide an option in the user interface to make a reservation for the use of one or more shared vehicles; and
prepopulate one or more parameters of the reservation based on a mobility graph, a registration with one or more shared vehicle operators, or a combination thereof.

10. The apparatus of claim 9, wherein the navigation route comprises a use of the one or more shared vehicles.

11. The apparatus of claim 10, wherein the apparatus is further caused to:
present the navigation route in a user interface of a device.

12. The apparatus of claim 11, wherein the apparatus is further caused to:
calculate a cost for the use of the one or more shared vehicles for the navigation route; and
present the cost in the user interface.

13. The apparatus of claim 10, wherein the apparatus is further caused to:
determine via an interaction with the user interface to select a type, an operator, or combination thereof of the one or more shared vehicle,
wherein the navigation route is further based on the selected type, the selected operator, or a combination thereof.

14. The apparatus of claim 10, wherein the one or more shared vehicle events include a when a shared vehicle is checked-out, where the shared vehicle is checked-out, when a shared vehicle is checked-in, where the shared vehicle is checked-in, how long the shared vehicle stayed at a location with the threshold proximity of the POI, or a combination thereof.

15. The apparatus of claim 9, wherein the apparatus is further caused to:
generate an estimated time of arrival for travel to or from the POI based on the use of the one or more shared vehicles; and
present the estimated time of arrival as an output.

16. The apparatus of claim 9, wherein the apparatus is further caused to:
generate an estimated time of arrival for travel to or from the POI based on the mobility insight data; and
present the estimated time of arrival as an output.

17. A non-transitory computer-readable storage medium carrying one or more sequences of one or more instructions which, when executed by one or more processors, cause an apparatus to perform:
retrieving shared vehicle data for a point of interest (POI), wherein the shared vehicle data indicates one or more shared vehicle events within a threshold proximity of the POI;
processing the shared vehicle data to determine mobility insight data, wherein the mobility insight data includes a shared vehicle usage pattern, a shared vehicle availability pattern, or a combination thereof for travel to or from the POI; and
generating a navigation route to the POI based on the mobility insight data;
providing an option in the user interface to make a reservation for the use of one or more shared vehicles; and
prepopulating one or more parameters of the reservation based on a mobility graph, a registration with one or more shared vehicle operators, or a combination thereof.

18. The non-transitory computer-readable storage medium of claim 17, wherein the navigation route comprises a use of the one or more shared vehicles.

19. The non-transitory computer-readable storage medium of claim 18, wherein the apparatus is caused to further perform:
presenting the navigation route in a user interface of a device.

20. A computer-implemented method comprising:
retrieving shared vehicle data for a point of interest (POI), wherein the shared vehicle data indicates one or more shared vehicle events within a threshold proximity of the POI;
processing the shared vehicle data to determine mobility insight data, wherein the mobility insight data includes a shared vehicle usage pattern, a shared vehicle availability pattern, or a combination thereof for travel to or from the POI, wherein the shared vehicle usage pattern is based on a percentage of each type of vehicle traveling to or from the POI; and
generating a navigation route to the POI based on the mobility insight data.

* * * * *